(12) United States Patent
Rochberger et al.

(10) Patent No.: US 8,918,117 B2
(45) Date of Patent: Dec. 23, 2014

(54) APPARATUS, SYSTEM AND METHOD OF ESTIMATING A LOCATION OF A MOBILE DEVICE

(71) Applicant: Intel Corporation, Santa Clara, CA (US)

(72) Inventors: Haim Rochberger, Tel Mond (IL); Yaron Alpert, Hod Hasharon (IL); Ehud Reshef, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 13/712,043

(22) Filed: Dec. 12, 2012

(65) Prior Publication Data

US 2014/0162683 A1    Jun. 12, 2014

(51) Int. Cl.
*H04W 88/02* (2009.01)
*H04W 64/00* (2009.01)

(52) U.S. Cl.
CPC .................................... *H04W 64/00* (2013.01)
USPC ..................................................... 455/456.1

(58) Field of Classification Search
USPC ................... 455/456.1, 456.6; 701/468, 500; 709/223, 203; 711/118
See application file for complete search history.

(56) References Cited

U.S. PATENT DOCUMENTS

| | | |
|---|---|---|
| 2008/0287143 A1 | 11/2008 | Banks et al. |
| 2009/0275344 A1* | 11/2009 | Carlson et al. ............. 455/456.1 |
| 2011/0201349 A1 | 8/2011 | Castillo et al. |
| 2013/0060467 A1* | 3/2013 | Nash ............................ 701/500 |
| 2013/0238857 A1* | 9/2013 | Daniel et al. .................. 711/118 |

FOREIGN PATENT DOCUMENTS

| | | |
|---|---|---|
| JP | 2004357216 | 12/2004 |
| JP | 2010230380 | 10/2010 |
| KR | 20120087472 | 8/2012 |

OTHER PUBLICATIONS

International Search Report and Written Opinion for PCT Patent Application No. PCT/US2013/047737, mailed on Oct. 22, 2013, 12 pages.
Wireless-Gigabit-Alliance (WGA) specifications (Wireless Gigabit Alliance, Inc WiGig MAC and PHY Specification Version 1.0, Final specification), Apr. 2010.
IEEE Std 802.11™—2012. Part 11: Wireless LAN Medium Access Control (MAC) and Physical Layer (PHY) Specifications, IEEE Standard for Information technology. Telecommunications and information exchange between systems Local and metropolitan area networks—Specific requirements, Mar. 29, 2012.
Wi-Fi Alliance Technical Committee P2P Task Group. Wi-Fi Peer-to-Peer (P2P) Technical Specification. Version 1.2; Dec. 14, 2011; 160 pages.
OMA Secure User Plane Location Archive, Candidate Version 2.0—May 27, 2011; Open Mobile Alliance OMA-AD-SUPL-V2_0-20110527-C; 54 pages.
Andrei Popescu, Google, Inc. Geolocation API Specfication, W3C Candidate Recommendation Sep. 7, 2010. W3C Geolocation Working Group; 14 pages.

* cited by examiner

*Primary Examiner* — Diane Mizrahi

(74) *Attorney, Agent, or Firm* — Shichrur & Co.

(57) ABSTRACT

Some demonstrative embodiments include devices, systems and/or methods of estimating a location of a mobile device. For example, a location estimation entity (LE) may be configured to receive from a server location-based location-enabling source (LES) information identifying one or more location-enabling sources based on a location area of a mobile device, and to communicate with the one or more identified location-enabling sources information for estimating the location of the mobile device.

26 Claims, 5 Drawing Sheets

APPARATUS, SYSTEM AND METHOD OF ESTIMATING A LOCATION OF A MOBILE DEVICE

BACKGROUND

Continuous location awareness is a highly desirable feature in modern devices. This capability is required, for example, to support location-based applications, Contextual Aware Computing and/or a multitude of Location Enabled Services (LES) applications, which require location updates, either periodic or sporadic/one time.

Various methodologies may be implemented for determining the location of a mobile device. Trilateration is a way of determining location using the locations of a plurality of other devices, generally referred to as location origins, e.g., cellular base stations, Access Points (APs), and the like.

A position calculation method may include measuring wave propagation parameters, e.g., Time of Flight (ToF) parameters, with respect to a location origin; estimating a distance between the mobile device and the location origin based on the measured parameters, and estimating a position, e.g., an absolute location, a movement, or any other position-related attribute, of the mobile device, for example, based on distances between the mobile device and a plurality of location origins, e.g., by trilateration.

The position calculation method may not provide a location estimation with a desired accuracy, for example, if one or more parameters provided by the location origins do not have a desired availability and/or accuracy.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
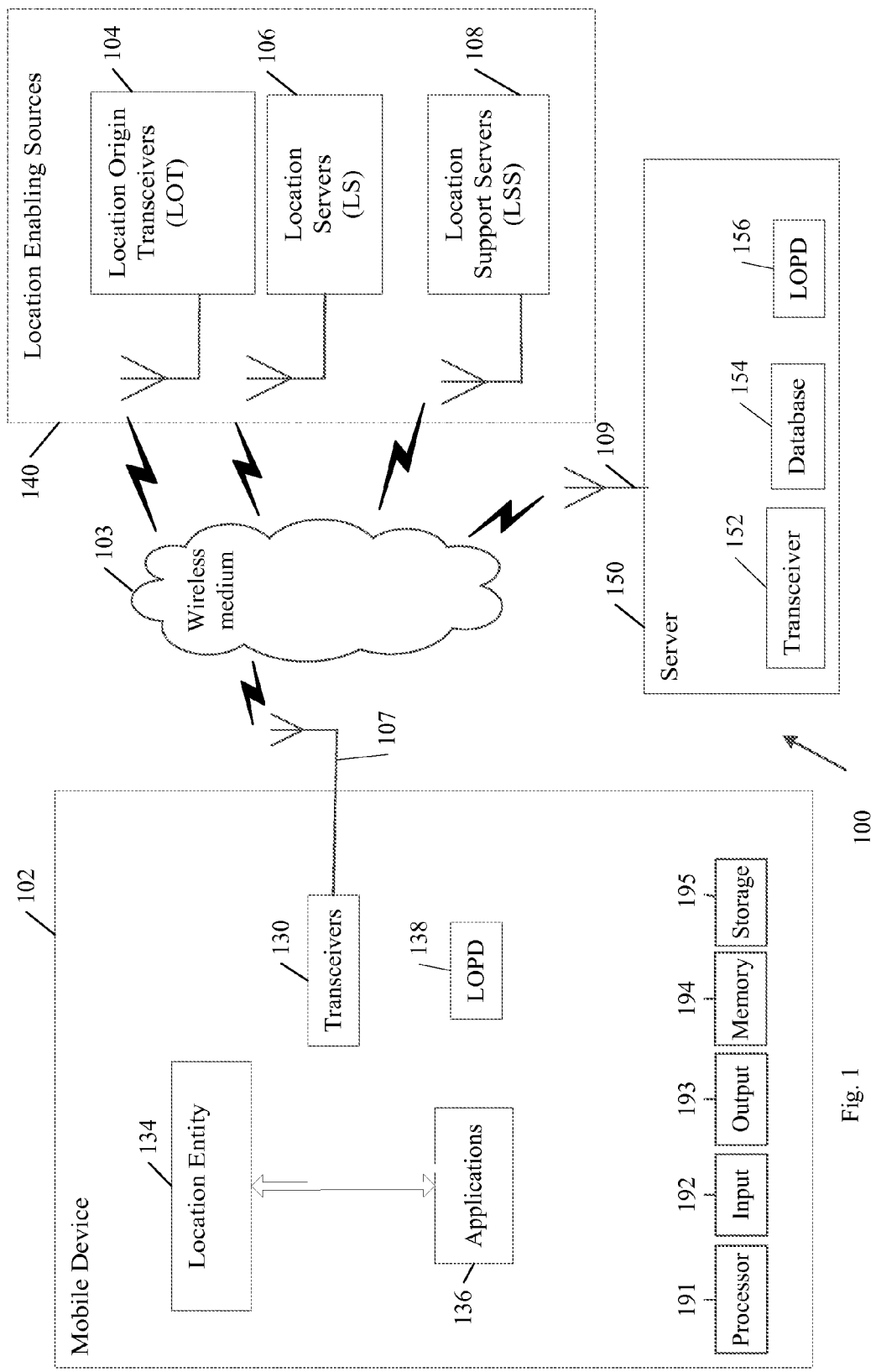
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar.* 29, 2102; IEEE802.11 task group ac (TGac) ("*IEEE*802.11-09/0308*r*12—*TGac Channel Model Addendum Document*"); *IEEE* 802.11 *task group ad* (*TGad*) (*IEEE* P802.11*ad Standard for Information Technology—Telecommunications and Information Exchange Between Systems—*

Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band)) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.3, 2012) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating", as used herein with respect to a wireless communication signal includes transmitting the wireless communication signal and/or receiving the wireless communication signal. For example, a transceiver, which is capable of communicating a wireless communication signal, may include a wireless transmitter to transmit the wireless communication signal to at least one wireless communication device, and/or a wireless communication receiver to receive the wireless communication signal from at least one wireless communication device. The signal may be communicated as part of a unidirectional communication or as part of a bidirectional communication.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 GHz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a wireless communication system 100, in accordance with some demonstrative embodiments.

In some demonstrative embodiments, system 100 may include a wireless communication device 102 capable of communicating content, data, information and/or signals over one or more wireless communication mediums 103.

In some demonstrative embodiments, wireless communication mediums 103 may include for example, a Radio Frequency (RF) channel, a WiFi channel, a Bluetooth channel, a cellular channel, a Global Navigation Satellite System (GNSS) Channel, a Near Field Communication (NFC) channel, a Frequency Modulation (FM) channel, and the like.

In some demonstrative embodiments, device 102 may include one or more transceivers 130 configured to communicate wireless communication signals via one or more antennas 107.

In some demonstrative embodiments, antennas 107 may include any type of antennas suitable for transmitting and/or receiving wireless communication signals, blocks, frames, transmission streams, packets, messages and/or data. Types of antennas that may be used for antennas 107 may include but are not limited to internal antenna, dipole antenna, omni-directional antenna, a monopole antenna, an end fed antenna, a circularly polarized antenna, a micro-strip antenna, a diversity antenna, a phase array antenna and the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, device 102 may include, or may be included as part of, a mobile or portable device, for example, a mobile computer, a laptop computer, a notebook computer, a tablet computer, a handheld computer, an Ultrabook™, a handheld device, a PDA device, a handheld PDA device, an on-board device, an off-board device, a hybrid device (e.g., combining cellular phone functionalities with PDA device functionalities), a consumer device, an Ultrabook™, a vehicular device, a non-vehicular device, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a gaming device, a data source, a data sink, a DSC, a media player, a Smartphone, a television, a music player, or the like.

In some demonstrative embodiments, device 102 may be located in a location area, e.g., an outdoor location area, an indoor location area, a vehicle, a building, an office, a mall, an airport, a street, a neighborhood, and the like.

In some demonstrative embodiments, system 100 may include at least one Location estimation Entity (LE) 134 configured to estimate the location of device 102 in the location area based on location-enabling information (LEI) received from one or more location-enabling sources 140, e.g., as described below.

In some demonstrative embodiments, LE 134 may be implemented as part of device 102, e.g., as shown in FIG. 1.

In some demonstrative embodiments, the phrase "location-enabling information" as used herein may include information, which may be configured to be used for, and/or to support, assist, facilitate, allow, help and/or enable, estimating one or more position-related parameters, e.g., a position fix (FIX), a position-velocity-time (PVT) and/or the like, representing a position of a mobile device, for example, a location of the mobile device, e.g., a relative location of the mobile device and/or an absolute location of the mobile device, a movement of the mobile device, and/or any other position-related attribute of the mobile device.

In some demonstrative embodiments, the "location estimation entity" as used herein may include any entity configured to estimate the location of the mobile device and/or the one or more position-related parameters of the mobile device, based on received LEI.

In some demonstrative embodiments, transceivers 130 may be configured to communicate with one or more location-enabling sources (LES) 140.

The phrase "location enabling sources" as used herein may include any one or more sources, e.g., devices and/or modules, configured to provide LEI, e.g., to broadcast and/or transmit the LEI to device 102.

In some demonstrative embodiments, transceivers 130 may include one or more WiFi transceivers, one or more Bluetooth (BT) transceivers, one or more cellular transceivers, e.g., a second generation cellular (2G) transceiver, a third generation cellular (3G) transceiver, a Universal Mobile Telecommunication System (UMTS) transceiver, a Long Term Evolution (LTE) transceiver, one or more NFC transceivers, one or more GNSS transceivers, and/or one or more digital radio (DR) transceivers, and/or the like. In some demonstrative embodiments, transceivers 130 may include any other transceiver.

In some demonstrative embodiments, LES 140 may include one or more Location Origin Transceivers (LOTs) 104.

The phrase "Location Origin Transceiver" as used herein may relate to any unit, device and/or model capable of providing a device with information to be used for determining a relative location, e.g., a distance, between the device and the LOT.

In some demonstrative embodiments, LOTs 104 may include one or more sources configured to provide location information to device 102, which may be used by LE 134 to estimate a relative location of device 102 with respect to LOTs 104.

For example, LOTs 104 may include one or more cellular source transmitters, e.g., cellular base stations, cellular operators, cellular antennas and the like, one or more digital radio stations, one or more BT devices, one or more WiFi hotspots or APs, one or more NFC devices, one or more GNSS satellites, and/or the like.

In some demonstrative embodiments, transceivers 130 may communicate with an LOT of LOTs 104 LEI including, for example, identifier information identifying the LOT; timing information corresponding to a timing of one or more wireless communication signals communicated between the LOT and device 102, e.g., a Time of Departure (ToD), a Time of Arrival (ToA), and the like; correction information, for example, clock bias information relating to a clock bias of the LOT, and the like; location information representing a location of the LOT, and the like.

In one example, a mobile device, e.g., device 102, may communicate with a WiFi LOT, e.g., an AP, wireless communication signals including LEI configured to estimate a distance between the mobile device and the WiFi LOT based on a Time of Flight (ToF) measurement. According to this example, the LEI may include, for example, an identifier to identify the WiFi AP, one or more ToD values corresponding to a ToD of the wireless communication signals and/or one or more ToA values corresponding to a ToA of the wireless communication signals.

In another example, a mobile device, e.g., device 102, may communicate with a WiFi LOT, e.g., an AP, wireless communication signals including LEI configured to estimate a distance between the mobile device and the WiFi LOT based on a Received Signal Strength Indication (RSSI) measurement. According to this example, the LEI may include, for example, an identifier to identify the WiFi AP, an absolute location of the WiFi AP, and the like.

In some demonstrative embodiments, the LEI communicated between device 102 and the LOT 104, may include any information, which may be indicative of a relative location and/or position, e.g., a distance and/or velocity, between device 102 and the LOT 104 and/or any information, which may be used a part of a location measurement for estimating the relative location, e.g., the distance, between device 102 and the LOT 104.

For example, the LEI may include one or more timing parameters representing timing information corresponding to one or more wireless communication signals communicated between transceivers 130 and LOTs 104; one or more distance parameters representing distance information corresponding to measured distances between device 102 and LOTs 104; one or more absolute location parameters representing an absolute location of LOTs 104; and/or any other information.

In some demonstrative embodiments, LE 104 may determine location-related measurements corresponding to a location of device 102 based on the LEI received from LOTs 104.

For example, transceivers 130 may determine one or more ToF measurements with respect to wireless communication signals communicated between transceivers 130 and LOTs 104.

In some demonstrative embodiments, location-enabling sources 140 may include one or more Location Servers (LSs) 106.

In some demonstrative embodiments, LSs 106 may include any servers configured to provide location information and/or location services, which are associated with one or more LOTs of LOTs of 104. For example a LS may provide absolute locations, e.g., marked on a map, of the one or more LOTs 104 and/or any other information relating to LOTs 104.

For example, LSs 106 may include one or more cellular servers, e.g., cellular base station servers, cellular operator servers, cellular antenna servers and the like, one or more digital radio servers, one or more BT servers, one or more WiFi servers, one or more NFC servers, and the like.

In some demonstrative embodiments, transceivers 130 may communicate with a LS of LSs 106 LEI including one or more location services provided by the server, for example, cellular tower location databases, RF fingerprinting databases, WiFi APs location databases, BT beacon location databases, NFC reader location databases, network provider location databases, and the like.

In some demonstrative embodiments, location-enabling sources 140 may include one or more Location Support Servers (LSSs) 108.

In some demonstrative embodiments, LSSs 108 may include any server configured to provide supplementary location information associated with a specific location area, a specific technology, and/or the like. For example, LSSs 108 may include Venue maps, a three-dimension (3D) map of the venue, local mobile network operator (MNO) A-GNSS servers, Venue RF tuning parameters, local location servers and the like.

In some demonstrative embodiments, transceivers 130 may communicate with an LSS of LSSs 108 LEI including one or more location support services provided by LSSs 108, for example, Venue map databases, Venue RF tuning parameter databases, local location server databases and the like.

In some demonstrative embodiments, LE 134 may utilize the LEI received from LOTs 104, LSs 106 and/or LSSs 108 to estimate the location of device 102, and/or to estimate location-related attributes of device 102, e.g., velocity, orientation, acceleration and the like.

In one example, LE 134 may determine one or more relative distances to one or more APs of LOTs 104. For example, LE 134 may receive from LSs 106 locations of the APs, and/or from LSSs 108, RF tuning parameters of the APs. LE 134 may be able to determine an absolute and/or accurate location of device 102, based on the relative distances to the APs, the locations of the APs and/or the RF tuning parameter of the APs, for example, utilizing any suitable method and/or calculation, e.g., trilateration.

In another example, LE 134 may be utilized for indoor navigation in an indoor location area, e.g., an office. LE 134 may determine one or more relative distances to one or more BT devices of LOTs 104. For example, LE 124 may receive from LSs 106 the locations of the BT devices, and/or LE 134 may receive from LSSs 108 an indoor map of the office. Accordingly, LE 134 may be able to determine an absolute and/or accurate location of device 102, for example, to direct a user to a designated location in the office, e.g., utilizing the relative distances to the BT devices, the locations of the BT devices and/or the indoor map of the office, e.g., using any suitable method and/or calculation.

In some demonstrative embodiments, one or more LOTs of LOTs 104, one or more LSs of LSs 106, and/or one or more LSSs of LSSs 108 may be located within the location area of device 102.

In some demonstrative embodiments, one or more of the one or more LOTs, LSSs and/or LSs may have different key performance indicators (KPIs) and/or one or more associated servers, e.g., LSs and LSSs associated servers.

The term "KPI" may include any performance indicators corresponding to an entity and configured to evaluate an entity attribute, an entity activity, an entity behavior and/or the like, which are related to a performance of the entity.

In some demonstrative embodiments, KPIs of an LOT may include one or more particular attributes of the LOT, e.g., an accuracy of location information provided by the LOT, a power consumption for communicating with the LOT, a type of the LOT, an availability of the LOT, and the like; one or more attributes of a connectivity type to the LOT, e.g., half or full duplex, a connectivity wireless medium signal quality, a security level, a communication frequency band, and the like.

In some demonstrative embodiments, KPIs of an LS may include one or more particular attributes of the LS, e.g., an accuracy of location information provided by the LS, an availability of the LS, how recent is the location information provided by the LS, and the like; one or more attributes of a connectivity type to the LS, e.g., half or full duplex, a connectivity wireless medium signal quality, a security level, a communication frequency band, and the like.

In some demonstrative embodiments, KPIs of an LSS may include one or more particular attributes of the LSS, e.g., an accuracy of location information provided by the LS, an availability of the LS, how recent is the location information provided by the LSS, and the like; one or more attributes of a connectivity type to the LS, e.g., half or full duplex, a connectivity wireless medium signal quality, a security level, a communication frequency band, and the like.

In some demonstrative embodiments, device 102 may include or perform the functionality of one or more applications 136.

In some demonstrative embodiments, applications 136 may utilize the estimated location and the location-related attributes of device 102 ("location information") provided by LE 134.

In some demonstrative embodiments, application 136 may include, for example, an application of location-based device persona, an application of Contextual Aware Computing, one or more Location-Enabled Services (LES) applications, and the like. In other embodiments, application 136 may include any other type of application.

In one example, application 136 may include a road/terrain navigation application, which may use the location information in order to navigate a vehicle on a road/terrain.

In another example, application 136 may include a consumer application, a social application, an entertainment application, a sports application, e.g., a running application, a bicycle tour application, and the like, a location based recommendation application, e.g., a restaurant recommendation application, a touristic location recommendation application, an entertainment recommendation application and the like, a tracking application, e.g., a fleet management application, a delivery management application, a transportation management application, and the like.

In some demonstrative embodiments, applications 136 may be characterized according to the intended use of the location information.

For example, a first application 136 may have a first intended use for the requested location information, e.g., vehicle navigation, which may require relatively recent and up-to-date location information, e.g., compared to a second application 136, which may have a second intended use for the requested location information, e.g., a social application, which may require less-frequent updating of the location information.

In some demonstrative embodiments, the application and/or a service may be characterized according to a type of application/service and the required accuracy of the application/service, e.g., as follows:

TABLE 1

| Example of Service/Application type | Example of Accuracy |
|---|---|
| Outdoor navigation | Less than 10-20 m |
| Indoor navigation | Less than 1-5 m |
| Smart shopping | Less than 1-5 m |
| Anti Theft | Less than 5-10 m |
| Assets & people tracking | Less than 3-20 m |

In other embodiments, any other accuracy levels may be defined with respect to the applications of Table 1 and/or any other applications, scenarios, deployments and/or locations.

In some demonstrative embodiments, applications 136 may define one or more KPIs relating to the estimation of the position of device 102 based on the application/service type.

In some demonstrative embodiments, KPIs of an application may include a particular number of LOTs to be connected, e.g., one LOT, two or more LOTs; a particular type of LOTs to be connected, e.g., a cellular LOT, a WiFi LOT, and the like; one or more particular LOTs to be connected; one or more particular attributes of the LOTs to be connected, e.g., an accuracy of location information provided by the LOT, a power consumption for communicating with the LOT, an availability of the LOT, and the like; one or more attributes of a connection between the transceiver and the one or more LOTs, e.g., a connectivity type, e.g., half or full duplex, a connectivity wireless medium signal quality, a security level, a communication frequency band, and the like.

In some demonstrative embodiments, LE 134 may communicate with one or more LES 140 according to the KPIs to provide the location information to applications 136.

Using a dedicated predefined set of LES 140, e.g., a predefined set of LOTs 104, LSs 106, and LSSs 108 for estimating the location of device 102 may reduce location availability of applications 136, may reduce the accuracy of the estimated location and/or may reduce performance of device 102 and/or applications 136.

For example, an application 136 configured to use a dedicated set of LES 140, e.g., a dedicated set of APs of LOTs 104, may not utilize other LOTs, e.g., BT devices, NFC tags, which may provide more accurate location information to application 136. As a result, a performance of device 102 and/or application 136 may be reduced and/or a power consumption of device 102 may increase, e.g., due to the reduced accuracy of the estimated location of device 102.

Some demonstrative embodiments may include a method and/or apparatus, which may be utilized for efficient discovery of venue specific LOTs, LSs, and/or LSSs, their respective configuration, parameters and KPIs, based on information provided by a server, e.g., a Central Location Aiding (CLA) server entity, e.g., as described below.

In some demonstrative embodiments, system 100 may include a server 150, e.g., to perform the functionality of a CLA server, configured to define a particular set of LES 140 to be sued by LE 134, e.g., based on a location of device 102.

In some demonstrative embodiments, server 150 may be configured to transmit to device 102 particular location-based LES information corresponding to a particular location area of device 102, e.g., as described below.

In some demonstrative embodiments, the location-based LES information may identify one or more LES 140 to provide to device 102 LEI corresponding to the particular location area of device 102.

In some demonstrative embodiments, server 150 may include at least one transceiver 152 to communicate with device 102 and/or with LES 140 via one or more antennas 109 over wireless communication mediums 103.

In some demonstrative embodiments, server 150 may include a database 154 to store location-based LES information corresponding to a plurality of location areas. For example, database 154 may include for a particular location area a plurality of LOTs, LSs and/or LSSs of LES 140 located within the particular area. The database may also include, for example, additional information, for example, one or more performance parameters of the LOTs, LSs and/or LSSs located in the particular area.

In some demonstrative embodiments, server 150 may transmit to device 102 the location-based LES information corresponding to the location area of device 102.

In some demonstrative embodiments, server 150 may utilize a broadcast message, for example, to broadcast the location-based LES information, e.g., every predefined time period, for example, one second.

In some demonstrative embodiments, device 102 may receive the location-based LES information, when entering the location area, and/or when located close to the location area.

In some demonstrative embodiments, the location-based LES information may include information identifying a plurality of LES 140, and one or more performance parameters corresponding to the plurality of LES 140. For example, the location-based LES information may include one or more KPIs of the plurality of LES 140.

In some demonstrative embodiments, the location-based LES information may include LOT information identifying one or more LOTs 104 within the location area. For example, the location-based LES information may include LOT information identifying one or more LOTs 104, e.g., APs, one or more NFC tags, one or more BT devices and the like. Device 102 may communicate with LOTs 104 location information, for example, by performing TOF measurements with LOTs 104, including relative location of device 102 to LOTs 104.

In some demonstrative embodiments, the location-based LES information may include LS information identifying one or more LS 106 within the location area. For example, the location-based LES information may include LS information identifying one or more WiFi location servers to provide locations of one or more WiFI APs within the location area, one or more BT servers to provide locations of one or more BT devices within the location area, one or more NFC servers to provide locations of one or more NFC tags located within the location area, and/or the like.

In some demonstrative embodiments, the location-based LES information may include LSS information identifying one or more LSSs 108 within the location area. For example, the location-based LES information may include LSS information identifying one or more LSSs within the location area including, for example, 3D maps of the location area, an RF fingerprint of the location area and/or the like.

In some demonstrative embodiments, server 150 may transmit the location-based LES information in response to a request from device 102.

In some demonstrative embodiments, device 102 may request the location-based LES information from server 150, e.g., upon entering the location area, and/or when located close to the location area, e.g., as described below with reference to FIG. 3.

In some demonstrative embodiments, LE 134 may transmit to server 150, e.g., via transceiver 130 and antennas 107, a request indicating the location area of device 102.

In some demonstrative embodiments, server 150 may receive the request and may retrieve from database 152 particular location-based LES information associated with the location area.

In some demonstrative embodiments, the particular location-based LES information may include information identifying one or more LES 140 and performance parameters corresponding to the one or more LES 140, e.g., as described above.

In some demonstrative embodiments, server 150 may transmit to device 102 the particular location-based LES information, e.g., in response to the request.

In some demonstrative embodiments, device 102 may receive the location-based LES information transmitted from server 150, and LE 134 may utilize the location-based LES information to communicate with one or more LESs 140 to determine an estimated location of device 102, e.g., as described below.

In some demonstrative embodiments, LE 134 may select one or more LES of LES 140 based on the performance parameters, e.g., an accuracy parameter.

In some demonstrative embodiments, LE 134 may communicate location information with the selected one or more LES 140.

For example, application 136 may perform the functionality of a Smart shopping application having an accuracy criterion of less than 1-5 meters, e.g., as described above with reference to Table 1. Device 102 may request from server 150, e.g., when located close to a shopping mall, location-based LES information corresponding to the shopping mall. Server 150 may retrieve from database 152 the particular location-based LES information of the shopping mall and may transmit the location-based LES information to device 102. The location-based LES information may identify a plurality of LES, e.g., BT devices, WiFi APs, cellular antennas, NFC tags, a WiFi location server, and/or the like. LE 134 may select one or more LES from the identified LES based on the accuracy criterion. For example, LE 134 may select the BT devices, the WiFi APs and the WiFi location server, which correspond to the accuracy criterion. LE 134 may not select the cellular antennas and the NFC tags, which may not correspond to the accuracy criterion. LE 134 may communicate location information with the WiFi APs and the BT devices, for example, by performing ToF measurements. LE 134 may communicate location information with the WiFi location server, for example, by receiving the WiFi APs locations, to estimate the location of device 102.

In some demonstrative embodiments, the particular location-based LES information may include at least one policy defining a plurality of LOT schemes, each scheme including at least one LOT of LOTs 104.

In some demonstrative embodiments, the policy may define the plurality of the LOTs schemes based on one or more criteria, for example, an accuracy criterion.

For example, the policy may include an accuracy policy defining one or more LOT schemes based on an accuracy criterion.

In some demonstrative embodiments, the LOT schemes may include one or more LOTs 104 from a specific technology, based on the specific technology accuracy with respect to a specific deployment scheme at a specific location, e.g., as follows:

TABLE 2

| Example of Technology | Example of Accuracy for scenario |
|---|---|
| Cellular | 100-250 m |
| WiFi | 50-100 m |
| WiFi + BT | 5-50 m |
| WiFi + BT + SensorX (Hybrid) | 1-5 m |
| WiFi + BT + NFC | 20 cm-1 m |

In one example, the accuracy policy may define a plurality of LOT schemes, e.g., a first LOT scheme of an accuracy criterion of between 100-250 meters (m) including one or more cellular antennas of LOTs 104 within the location area; a second LOT scheme of an accuracy criterion of between 50-100 m including one or more APs of LOTs 104 within the location area; a third LOT scheme for an accuracy criterion of between 5-50 m including one or more APs and one or more BT devices of LOTs 104 within the location area; a fourth LOT scheme for an accuracy criterion of between 1-5 m including one or more APs, one or more BT devices and one or more SensorX devices of LOTs 104 within the location area; and/or a fifth LOT scheme of an accuracy criterion of between 20 centimeters (cm) and 1 m including one or more APs, one or more NFC tags, and one or more BT devices of LOTs 104 within the location area.

In other embodiments, any other LOT scheme may be defined with respect to any other technologies and/or accuracies corresponding to any other specific deployment scheme, scenario and/or location.

In some demonstrative embodiments, server 150 may include a Location Origin Policy Decision (LOPD) 156 module configured to select the policy from one or more policies stored in database 152, and/or to select a suitable LOT scheme to be used by a device, e.g., device 102, for example, based on the device type, e.g., a vehicular navigation device or an indoor navigation device.

In some demonstrative embodiments, LE 134 may select an LOT scheme of the LOT schemes based on at least one predefined performance parameter.

In some demonstrative embodiments, device 102 may be able to utilize a plurality of location determining policies, e.g., each policy configured to one or more required KPI of an application and/or a service.

In some demonstrative embodiments, LE 134 may include a LOPD 138 module configured to select the LOT scheme based on the predefined performance parameter and/or to select the different policies for different applications 136.

In some demonstrative embodiments, LE 134 may communicate with one or more LOTs of the selected LOT scheme to estimate the location of device 102, e.g., as described above.

For example, application 136 may perform the functionality of a Smart shopping application having an accuracy criterion of between 1-5 meters, e.g., as described above with reference to Table 1. LE 134 may determine the predefined performance parameter to include an accuracy of between 1-5 meters. Device 102 may request from server 150, e.g., when located close to a shopping mall, location-based LES information of the shopping mall. Server 150 may retrieve from database 152 the location-based LES information of the shopping mall and may transmit the location-based LES information to device 102. The location-based LES information may include an accuracy policy, defining a plurality of LOT schemes, e.g., as described above with reference to Table 2. LE 134 may select the fourth LOT scheme according to the predefined performance parameter. The fourth LOT scheme may include, for example, BT devices, WiFi APs and a WiFi location server located within the shopping mall. LE 134 may communicate location information with the WiFi APs and the BT devices, for example, by performing ToF measurements. LE 134 may communicate location information with the WiFi location server, for example, for receiving the WiFi APs locations, to estimate the location of device 102.

In another example, device 102 may be able to utilize different policies for different applications 136 based on the KPIs of applications 136. For example, LE 134 may select one LOT scheme for the smart shopping application, and LE 134 may select another LOT scheme for the Anti Theft application, e.g., as described above with reference to Table 1.

In some demonstrative embodiments, server 150 may transmit to device 102 first location-based LES information identifying one or more first LES 140, and may transmit to device 102 an update including second location-based LES information, different from the first location-based LES information, identifying one or more second LES 140, e.g., as described below with reference to FIG. 4.

In one example, the first location-based LES information may indentify a first set of WiFi APs and a WiFi location server of LES 140 associated with the first set of WiFi APs. The second location-based LES information may identify a second, different, set of WiFi APs, a set of BT devices, and one or more location servers associated with the WiFi APs and the BT devices of LES 140.

In some demonstrative embodiments, server 150 may transmit the update, for example, upon detecting one or more changes of LES 140, e.g., a change in one or more LOTs 104, a change in one or more LSs 106 and/or a change in one or more LSSs 108.

In one example, a change in LOTs 104 may include adding or removing one or more LOTs 104, e.g., upon installing a new LOT or removing an existing LOT, for example, an AP, an NFC tag, a BT device and/or the like.

In another example, a change in LOTs 104 may include a change in the one or more KPIs of LOTs 104. For example, a change in an LOT may include a change in an availability of the LOT, an accuracy, of the LOT, a connectivity of the LOT and/or the like.

In a further example, a change in LSs 106 and/or LSSs 108 may include adding or removing of one or more LSs 106 and/or LSSs 108, and/or changing of an attribute, e.g., an availability and/or connectivity of one or more LSs 106 and/or LSSs 108. For example, the change may include installing a new WiFi location server, removing/adding one or more NFC tags, installing new 3D maps of the location area in an LSS, and/or the like.

In some demonstrative embodiments, server 150 may transmit the update periodically, for example, every predefined time period, e.g., one minute.

In some demonstrative embodiments, device 102 may receive the update and LE 134 may estimate the location of device 102 based on the location-based LES information included in the update.

In some demonstrative embodiments, system 100 may include a plurality of servers 150. LE 134 may communicate with a relevant subset of one or more of servers 150, for example, based on the location of device 102.

In some demonstrative embodiments, device 102 may have greater location availability due to the ability to utilize multiple LOTs of the location area. For example, device 102 may be able to utilize the APs and the BT devices of LOTs 104.

In some demonstrative embodiments, device 102 may receive independent aggregated information, e.g., aggregated by server 150, on available LES, e.g., in addition to location information received directly from one or more of LOTs 104.

In some demonstrative embodiments, system 100 may provide architecture scalability, e.g., adding more information layers in server 150 and/or database 152, without changing an architecture and/or configuration of device 102, and allowing future capability upgrades of device 102. For example, one or more LES of LES 140 may be added, updated or removed without requiring a change in device 102 and/or applications 136.

In some demonstrative embodiments, device 102 may have increased overall location awareness availability, for example, as a result of receiving the location-based LES information corresponding to the location area of device 102, which may have better accuracy, availability and/or the like.

In some demonstrative embodiments, device 102 may have reduced power consumption, e.g., due to the increased location awareness. For example, LE 134 may be required to utilize a reduce communication period to estimate the location of device 102.

In some demonstrative embodiments, device 102 may have better performance, e.g., when estimating the location of device 102, for example, by reducing the time to estimate the location of device 102.

In some demonstrative embodiments, device 102 may also include, for example, one or more of a processor 191, an input unit 192 an output unit 193, a memory unit 194, and a storage unit 195. Device 102 may optionally include other suitable hardware components and/or software components. In some embodiments, some or all of the components of device 102 may be enclosed in a common housing or packaging, and may be interconnected or operably associated using one or more wired or wireless links. In other embodiments, components of device 102 may be distributed among multiple or separate devices or locations.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102, of one or more of applications 136, and/or of one or more suitable applications.

Input unit 192 includes, for example, a keyboard, a keypad, a mouse, a touch-pad, a track-ball, a stylus, a microphone, or other suitable pointing device or input device. Output unit 193 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. For example, memory 194 and/or storage unit 195 may store instructions resulting in one or more of applications 136.

Figure 2:
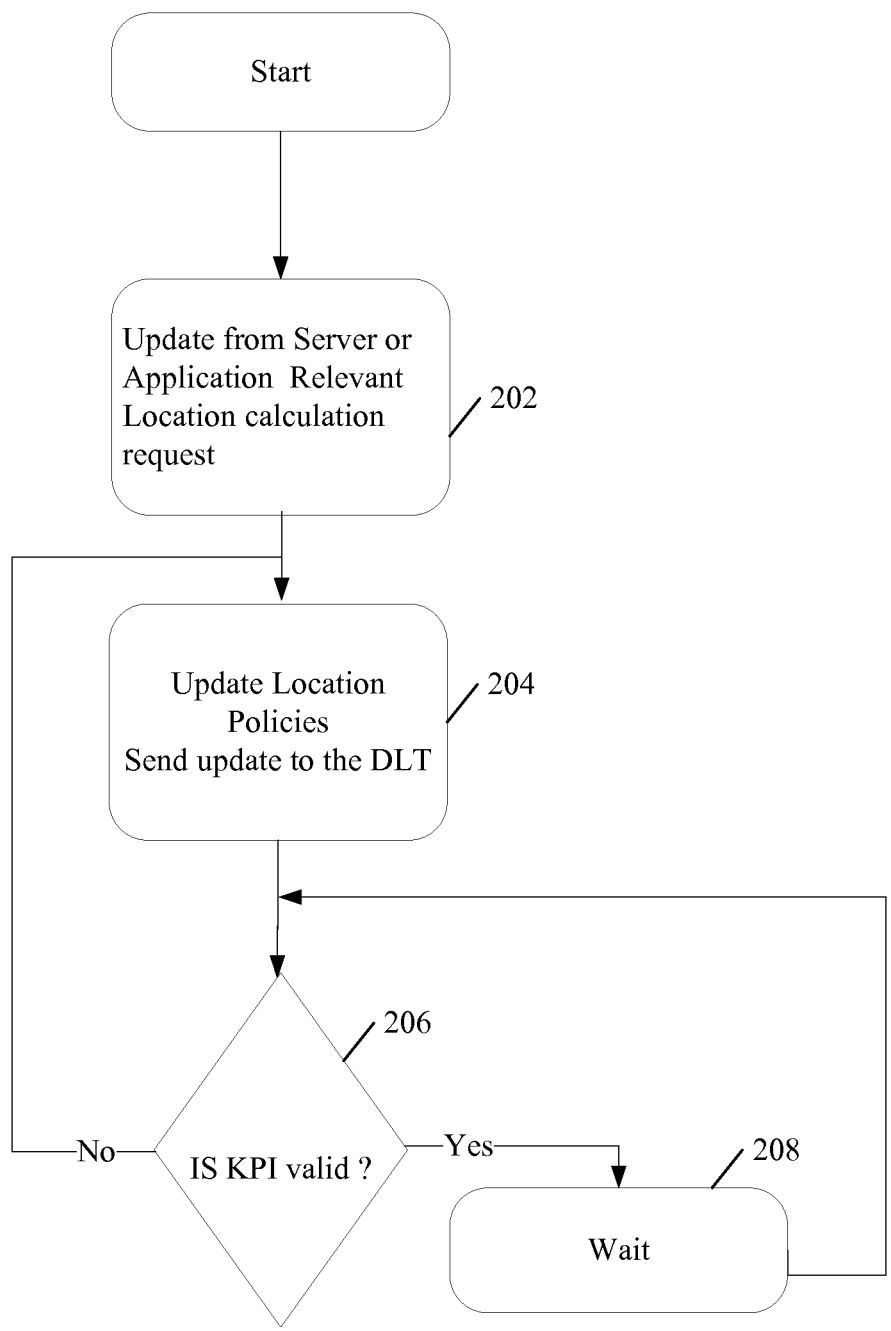
FIG. 2 is a schematic flow chart illustration of a method of updating location-enabling information, in accordance with some demonstrative embodiments.

Reference is made to FIG. 2, which schematically illustrates a method of updating location-based LES information, in accordance with some demonstrative embodiments. In some demonstrative embodiments, one or more of the operations of the method of FIG. 2 may be performed by a location estimation entity, e.g., LE 134 (FIG. 1).

As indicated at block 202, the method may include receiving a location position request corresponding to a location of a mobile device, e.g., device 102 (FIG. 1); and/or an update from a server including location-based LES information. For example, LE 134 (FIG. 1) may receive a location position request from a location-based module, for example, an application, e.g., application 136 (FIG. 1). For example, device 102 (FIG. 1) may receive from server 150 (FIG. 1) the update including the first location-based LES information, e.g. as described above.

The location position request may define one or more KPIs relating to the estimation of the position of the mobile device, for example, a time period for providing the estimated position, an accuracy of the estimation, a power envelope corresponding to the estimation and/or the like, e.g., as described above.

As indicated at block 204, the method may include defining a location policy for controlling one or more transceivers (also referred to as Device Location transceivers (DLTs)) to communicate location information with one or more location enabling services. For example, LE 134 (FIG. 1) may define a location policy for controlling transceivers 130 (FIG. 1) to communicate location information with one or more of LOTs 104 (FIG. 1), LSs 106 (FIG. 1) and/or LSSs 108 (FIG. 1), e.g., as described above. In one example, device 102 (FIG. 1) may update the LOT schemes of the policy received from server 150 (FIG. 1), and transceivers 130 (FIG. 1) may be configured to communicate with the one or more LOTs included in the LOT schemes, e.g., as described above.

As indicated at block 206, the method may include determining whether or not the one or more KPIs are satisfied by the location information communicated by the location enabling services. For example, LE 134 (FIG. 1) may determine whether or not the location information communicated by transceivers 130 (FIG. 1) with LESs 104 meets the requirements of the KPIs defined by the location position request, e.g., as described above.

As indicated at block 208, the method may include, for example, processing the location information and/or continuing to communicate with the location enabling services, e.g., if the one or more KPIs are satisfied by the location information communicated by the location enabling services. For example, LE 134 (FIG. 1) may process the location information to estimate the location of device 102 (FIG. 1), e.g., as described above.

The method may include, for example, repeating the defining the location policy for controlling one or more transceivers, e.g., as indicated at block 204, for example, if the one or more KPIs are not satisfied by the location information communicated by the transceivers.

Figure 3:
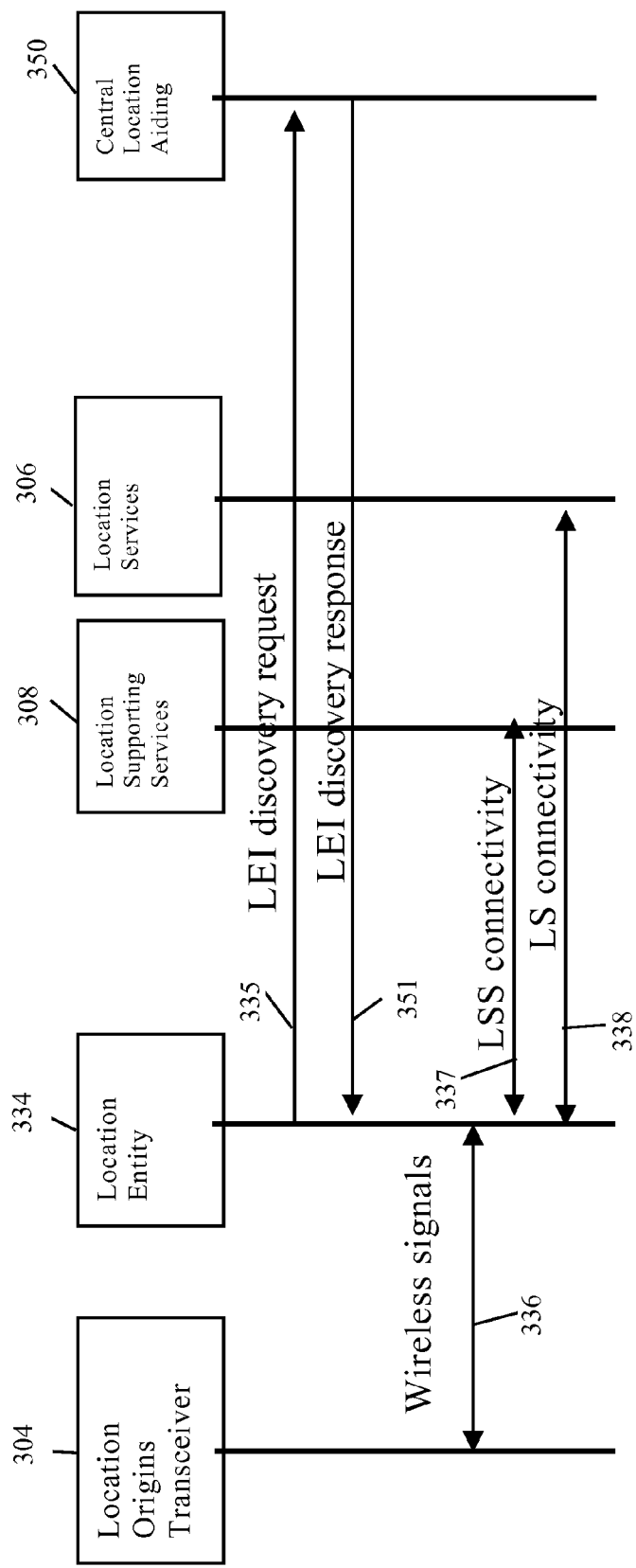
FIG. 3 is a schematic illustration of a sequence of operations performed by elements of a wireless communication system, in accordance with some demonstrative embodiments.

Reference is made to FIG. 3, which illustrates a sequence of operations performed by elements of a wireless communication system for location estimation, in accordance with some demonstrative embodiments.

In some demonstrative embodiments, a location-entity 334 may transmit an LEI discovery request 335 to a Central Location Aiding (CLA) server 350. For example, location-entity 334 may perform the functionality of LE 134 (FIG. 1), and/or CLA 350 may perform the functionality of server 150 (FIG. 1).

In some demonstrative embodiments, CLA server 350 may transmit an LEI discovery response 351 to LE 334, in response to LEI discovery request 335. Lei discovery response 351 may identify at least one LOT 304, one or more LS 306 and/or one or more LSSs 308. For example, LOT 304 may perform the functionality of LOT 104 (FIG. 1), LS 306 may perform the functionality of LS 106 (FIG. 1), and/or LSS 308 may perform the functionality of LSS 108 (FIG. 1).

In some demonstrative embodiments, LE 334 may communicate with LOT 304 location information 336, e.g., as described above.

In some demonstrative embodiments, LE 334 may communicate with LSS 308 location information 337, e.g., as described above.

In some demonstrative embodiments, LE 334 may communicate with LS 306 location information 338, e.g., as described above.

Figure 4:
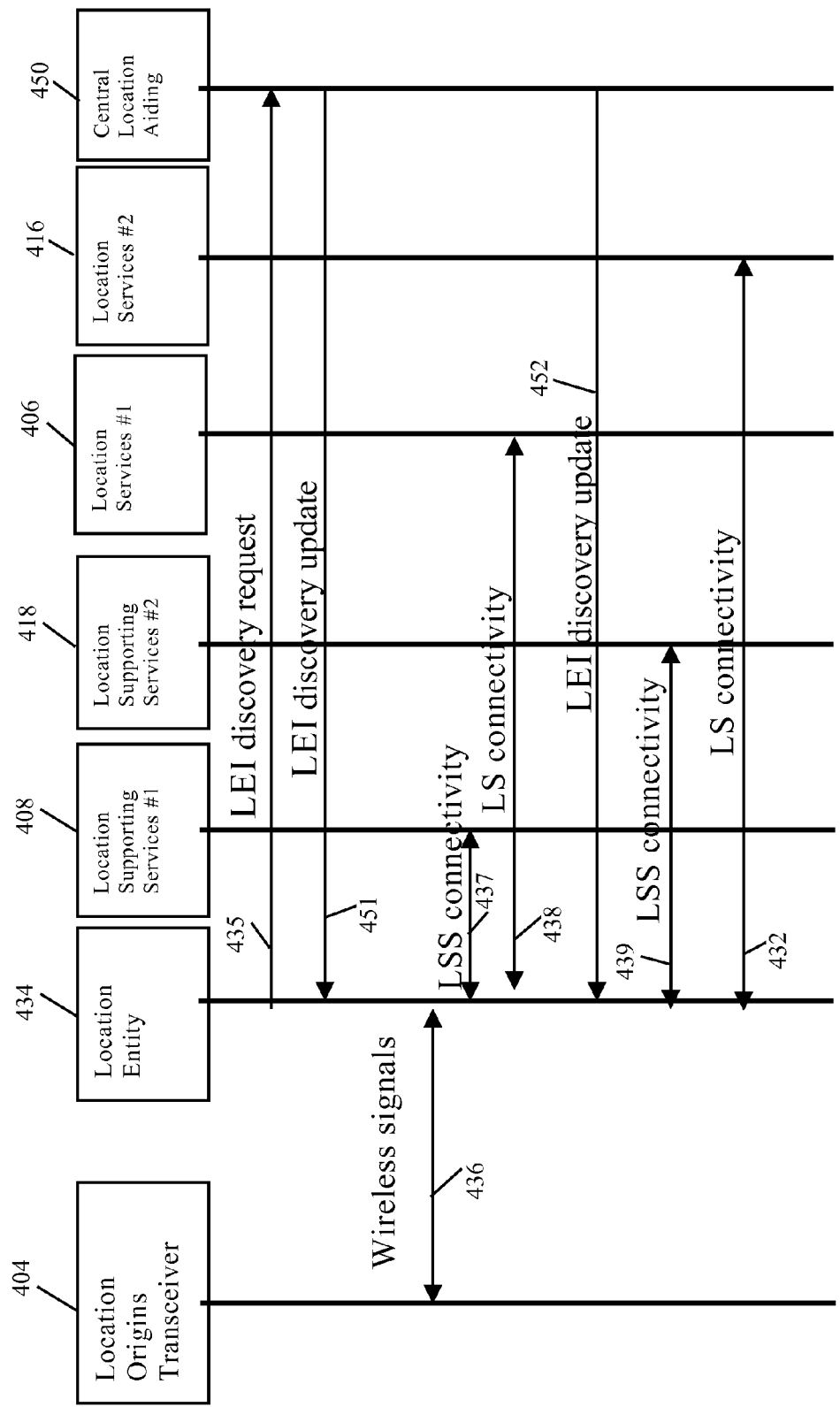
FIG. 4 is a schematic illustration of another sequence of operations performed by elements of a wireless communication system, in accordance with some demonstrative embodiments.

Reference is made to FIG. 4, which illustrates another sequence of operations performed by elements of a wireless communication system for location estimation, in accordance with some demonstrative embodiments.

In some demonstrative embodiments, a location-entity 434 may transmit an LEI discovery request 435 to a CLA server 450. For example, location-entity 434 may perform the functionality of LE 134 (FIG. 1), and/or CLA server 450 may perform the functionality of server 150 (FIG. 1).

In some demonstrative embodiments, CLA server 450 may transmit an LEI discovery response 451 to LE 434, in response to LEI discovery request 435. Lei discovery response 451 may identify a first set of at least one LOT 404, one or more LS 406 and/or one or more LSSs 408. For example, LOT 404 may perform the functionality of LOT 104 (FIG. 1), LS 406 may perform the functionality of LS 106 (FIG. 1), and/or LSS 408 may perform the functionality of LSS 108 (FIG. 1).

In some demonstrative embodiments, LE 434 may communicate with LOT 404 location information 436, e.g., as described above.

In some demonstrative embodiments, LE 434 may communicate with LSS 408 location information 437, e.g., as described above.

In some demonstrative embodiments, LE 434 may communicate with LS 406 location information 438, e.g., as described above.

In some demonstrative embodiments, CLA server 450 may transmit an LEI discovery update 452 to LE 434, identifying a second, different, set of at least one LOT 404, one or more LSs 416 and/or one or more LSSs 418. For example, LS 416 may perform the functionality of LS 106 (FIG. 1), and/or LSS 418 may perform the functionality of LSS 108 (FIG. 1). For example, CLA 450 may transmit update 452 due to a change in LS 406 and/or LSS 408, e.g., as described above.

In some demonstrative embodiments, LE 434 may communicate with LSS 418 location information 439, e.g., as described above.

In some demonstrative embodiments, LE 434 may communicate with LS 416 location information 432, e.g., as described above.

Figure 5:
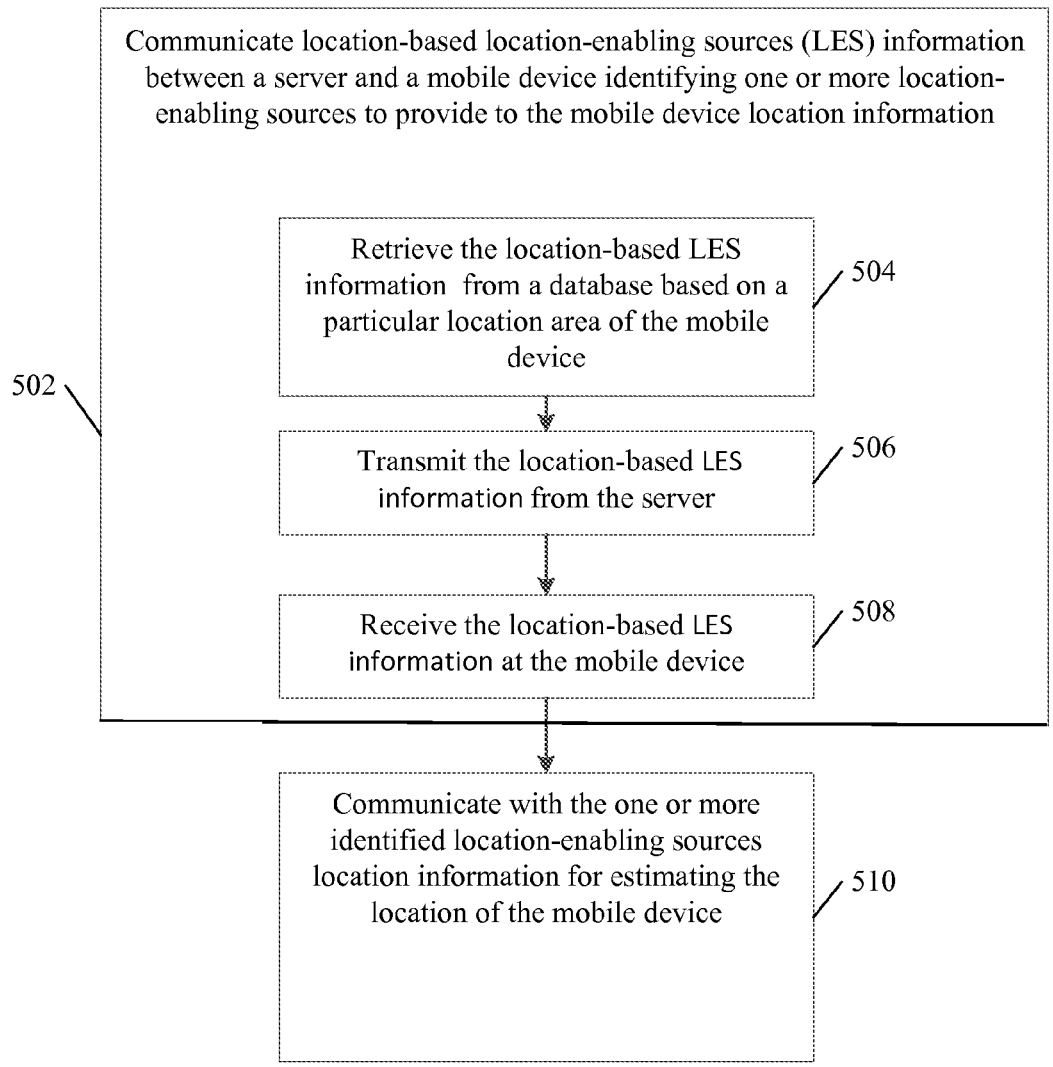
FIG. 5 is a schematic flow chart illustration of a method of estimating a location of a mobile device, in accordance with some demonstrative embodiments.

Reference is made to FIG. 5, which schematically illustrates a method of estimating allocation of mobile device, in accordance with some demonstrative embodiments. In some demonstrative embodiments, one or more operations of the method of FIG. 5 may be performed by one or more elements of system 100 (FIG. 1), e.g., device 102 (FIG. 1), server 150 (FIG. 1), and/or LE 134 (FIG. 1).

As indicated at block 502, the method may include communicating location-based LES information between a server and a mobile device, the location-based LES information corresponding to a particular location area of the mobile device and identifying one or more location-enabling sources to provide to the mobile device location information corresponding to the particular location area. For example, server 150 (FIG. 1) may communicate with device 102 (FIG. 1), the location-based LES corresponding to the particular location area of device 102 (FIG. 1) and identifying one or more LES 140 (FIG. 1) to provide to device 102 location information corresponding to the particular location area, e.g., as described above.

As indicated at block 504, communicating the location-based LES information may include retrieving the location-based LES information from a database based on the particular location area of the mobile device. For example, server 150 (FIG. 1) may retrieve the location-based LES information from database 152 (FIG. 1), e.g., based on the particular location area of mobile device 102 (FIG. 1), e.g., as described above.

As indicated at block 506, communicating the location-based LES information may include transmitting the location-based LES information from the server. For example, server 150 (FIG. 1) may transmit the location-based LES information to device 102 (FIG. 1), e.g., as described above.

As indicated at block 508, communicating the location-based LES information may include receiving the location-based LES information at the mobile device. For example, device 102 (FIG. 1) may receive the location-based LES information e.g., as described above.

As indicated at block 510, the method may include communicating with the one or more identified location-enabling sources location information for estimating the location of the mobile device. For example, device 102 (FIG. 1) may communicate with one or more LES 140 (FIG. 1) location information for estimating the location of mobile device 102 (FIG. 1), e.g., as described above.

Figure 6:
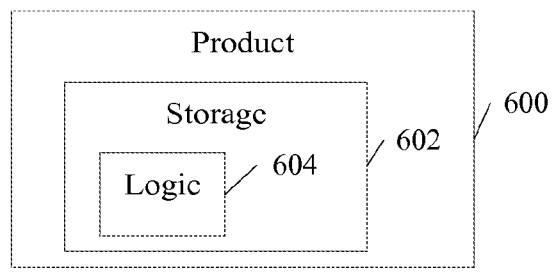
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of device 102 (FIG. 1), LE 134 (FIG. 1), server 150 (FIG. 1), and/or to perform one or more operations of the method of FIG. 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of embodiments have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
 a location estimation entity (LE) to receive from a server location-based location-enabling source (LES) information identifying one or more location-enabling sources based on a location area of a mobile device, and to communicate with the one or more identified location-enabling sources information for estimating the location of said mobile device,
 wherein said location-based LES information includes Location-Origin-Transceiver (LOT) information identifying one or more LOTs within said location area, and wherein said LE is to communicate with said one or more LOTs information representing a relative location of said mobile device relative to said one or more LOTs.

2. The apparatus of claim 1, wherein said one or more location-enabling sources include a plurality of location-enabling sources, wherein said location-based LES information includes one or more performance parameters corresponding to said plurality of location-enabling sources, and wherein said LE is to select at least one of said location-enabling sources based on said performance parameters.

3. The apparatus of claim 1, wherein said location-based LES information includes at least one policy defining a plurality of LOT schemes, each scheme including at least one LOT, and wherein said LE is to select an LOT scheme of said schemes based on at least one predefined performance parameter, and to communicate with one or more LOTs of the selected LOT scheme.

4. The apparatus of claim 1 comprising said mobile device, said mobile device including:
one or more antennas; and
at least one transceiver to communicate with said sever via said one or more antennas.

5. An apparatus comprising:
a location estimation entity (LE) to receive from a server location-based location-enabling source (LES) information identifying one or more location-enabling sources based on a location area of a mobile device, and to communicate with the one or more identified location-enabling sources information for estimating the location of said mobile device,
wherein said LE is to receive from said server first location-based LES information identifying one or more first location-enabling sources, to communicate with said first location-enabling sources, to receive from said server an update including second location-based LES information, different from said first location-based LES information, identifying one or more second location-enabling sources, and to communicate with said second location-enabling sources.

6. The apparatus of claim 5, wherein said LE is to transmit to said server a request indicating the location area of said mobile device, and to receive from said server a response including said location-based LES information.

7. An apparatus comprising:
a location estimation entity (LE) to receive from a server location-based location-enabling source (LES) information identifying one or more location-enabling sources based on a location area of a mobile device, and to communicate with the one or more identified location-enabling sources information for estimating the location of said mobile device,
wherein said location-based LES information includes Location Server (LS) information identifying one or more location servers within said location area, and wherein said LE is to communicate with said one or more location servers to receive one or more location services corresponding to the location of said mobile device.

8. The apparatus of claim 7, wherein said one or more location-enabling sources include a plurality of location-enabling sources, wherein said location-based LES information includes one or more performance parameters corresponding to said plurality of location-enabling sources, and wherein said LE is to select at least one of said location-enabling sources based on said performance parameters.

9. A system comprising:
a server including:
at least one transceiver to communicate with a mobile device; and
a database to store location-based location-enabling source (LES) information corresponding to a plurality of location areas,
wherein said server is to transmit to said mobile device particular location-based LES information corresponding to a particular location area of said mobile device, said particular location-based LES information identifies one or more location-enabling sources to provide to said mobile device location information corresponding to said particular location area,
wherein said server is to transmit to said mobile device first location-based LES information identifying one or more first location-enabling sources, and to transmit to said mobile device an update including second location-based LES information, different from said first location-based LES information, identifying one or more second location-enabling sources.

10. The system of claim 9, wherein said one or more location-enabling sources include a plurality of location-enabling sources, and wherein said LES information includes one or more performance parameters corresponding to said plurality of location-enabling sources.

11. A system comprising:
a server including:
at least one transceiver to communicate with a mobile device; and
a database to store location-based location-enabling source (LES) information corresponding to a plurality of location areas,
wherein said server is to transmit to said mobile device particular location-based LES information corresponding to a particular location area of said mobile device, said particular location-based LES information identifies one or more location-enabling sources to provide to said mobile device location information corresponding to said particular location area,
wherein said location-based LES information includes Location-Origin-Transceiver (LOT) information identifying one or more LOTs within said location area to communicate with said mobile device location information representing a relative location of said mobile device relative to said one or more LOTs.

12. The system of claim 11, wherein said server is to receive from said mobile device a request indicating the particular location area of said mobile device, and to transmit to said mobile device a response including said particular location-based LES information.

13. The system of claim 11, wherein said one or more location-enabling sources include a plurality of location-enabling sources, and wherein said LES information includes one or more performance parameters corresponding to said plurality of location-enabling sources.

14. The system of claim 11, wherein said location-based LES information includes at least one policy defining a plurality of LOT schemes, each scheme including at least one LOT.

15. The system of claim 11, wherein said location-based LES information includes Location Server (LS) information identifying one or more location servers within said location area to provide to said mobile device one or more location services corresponding to the location of said mobile device.

16. A method performed by a mobile device or a server, the method comprising:
communicating location-based location-enabling source (LES) information between said server and said mobile device, the location-based LES information corresponding to a particular location area of the mobile device and identifying one or more location-enabling sources to provide to said mobile device location information corresponding to said particular location area,
wherein said location-based LES information includes Location-Origin-Transceiver (LOT) information identifying one or more LOTs within said location area to communicate with said mobile device location information representing a relative location of said mobile device relative to said one or more LOTs.

17. The method of claim 16, wherein said communicating comprises receiving said location-based LES information at said mobile device, the method comprising communicating with the one or more identified location-enabling sources location information for estimating the location of said mobile device.

18. The method of claim 16, wherein said communicating comprises transmitting said location-based LES information from said server, the method comprising retrieving said location-based LES information from a database based on the particular location area of said mobile device.

19. The method of claim 16, wherein said one or more LES include a plurality of LES, and wherein said location-based LES information includes one or more performance parameters corresponding to said plurality of LES.

20. The method of claim 16, comprising communicating first location-based LES information identifying one or more first location-enabling sources, and communicating an update including second location-based LES information, different from said first location-based LES information, identifying one or more second location-enabling sources.

21. The method of claim 16, wherein said location-based LES information includes at least one policy defining a plurality of LOT schemes, each scheme including at least one LOT.

22. The method of claim 16, wherein said location-based LES information includes Location Server (LS) information identifying one or more location servers within said particular location area to provide to said mobile device one or more location services corresponding to the location of said mobile device.

23. A product including a non-transitory storage medium having stored thereon instructions that, when executed by a machine, result in performing at a mobile device or a server a method comprising:
 communicating location-based location-enabling source (LES) information between said server and said mobile device, the location-based LES information corresponding to a particular location area of the mobile device and identifying one or more location-enabling sources to provide to said mobile device location information corresponding to said particular location area,
 wherein said location-based LES information includes Location-Origin-Transceiver (LOT) information identifying one or more LOTs within said location area to communicate with said mobile device location information representing a relative location of said mobile device relative to said one or more LOTs.

24. The product of claim 23, wherein said communicating comprises receiving said location-based LES information at said mobile device, and wherein the method comprises communicating with the one or more identified location-enabling sources location information for estimating the location of said mobile device.

25. The product of claim 23, wherein said communicating comprises transmitting said location-based LES information from said server, and wherein in the method comprises retrieving said location-based LES information from a database based on the particular location area of said mobile device.

26. The product of claim 23, wherein said location-based LES information includes Location Server (LS) information identifying one or more location servers within said particular location area to provide to said mobile device one or more location services corresponding to the location of said mobile device.

* * * * *